United States Patent [19]

Fazio et al.

[11] Patent Number: 4,754,278
[45] Date of Patent: Jun. 28, 1988

[54] METHOD FOR THE IN-LINE MEASUREMENT OF BACKGROUND NOISE FOR MTI RADAR WITH SUPPRESSION OF SAMPLES NOT ORIGINATING FROM NOISE, AND DIGITAL DEVICE EMBODYING SAID METHOD

[75] Inventors: Umberto Fazio; Alessandro Di Berardino; Mauro Mecucci, all of Rome, Italy

[73] Assignee: Contraves Italiana S.p.A., Italy

[21] Appl. No.: 862,314

[22] Filed: May 12, 1986

[30] Foreign Application Priority Data

Dec. 18, 1985 [IT] Italy ................................ 23262 A/85

[51] Int. Cl.⁴ ............................................. G01S 13/52
[52] U.S. Cl. ..................................... 342/160; 342/195
[58] Field of Search .............. 342/93, 160; 324/57 N; 328/116, 117, 162, 165; 375/76, 99; 455/226

[56] References Cited

U.S. PATENT DOCUMENTS

| | | | |
|---|---|---|---|
| 3,761,922 | 9/1973 | Evans | 342/93 |
| 3,778,822 | 12/1973 | Bauer | 342/93 |
| 3,995,270 | 11/1976 | Perry et al. | 342/93 |
| 4,031,364 | 6/1977 | Wilmot | 342/93 X |
| 4,213,127 | 7/1980 | Cole | 342/93 |
| 4,249,177 | 2/1981 | Chen | 342/93 |

Primary Examiner—Theodore M. Blum
Assistant Examiner—Bernarr E. Gregory
Attorney, Agent, or Firm—Amster, Rothstein & Ebenstein

[57] ABSTRACT

Apparatus is provided for the automatic in-line measurement of background noise for MTI radar with automatic suppression of samples not originating from noise. The background noise level is determined by making use of summing and shifting operations only, and the suppression of samples not originating from noise is obtained by utilizing the information derived from a normal radar detector so that samples identified as true targets shall not contribute to the calculation of background noise level.

The apparatus comprises a multiplexer circuit (22), a first shifting circuit (23), a storage element (24), a second shifting circuit (25), an inverter (21), and a counter (26).

1 Claim, 2 Drawing Sheets

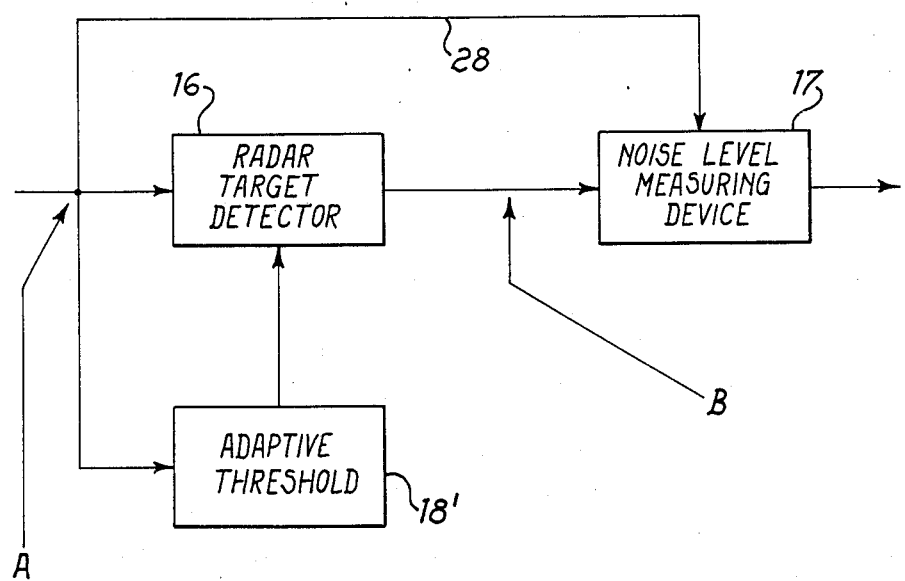
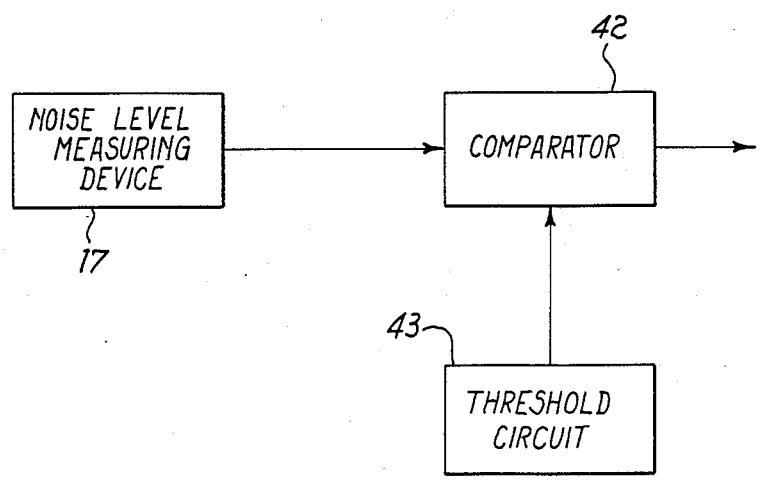

METHOD FOR THE IN-LINE MEASUREMENT OF BACKGROUND NOISE FOR MTI RADAR WITH SUPPRESSION OF SAMPLES NOT ORIGINATING FROM NOISE, AND DIGITAL DEVICE EMBODYING SAID METHOD

This invention concerns an improved digital device for the automatic measurement of the background noise of an MTI (Moving Target Indicator) radar system during its normal operation.

The availability of a continuous indication of the noise level which is being received by a radar makes it possible to detect malfunctionings in the entire system or any external jammings which intended to impair the radar performance. The background noise measurement in a radar apparatus entails some difficulties: first of all, the measurement has to be made for a limited time interval or, anyway, for a limited number of noise samples and therefore the estimate accuracy attainable depends on the time interval or the number of samples used; besides, unless suitable steps are taken, the background noise estimate is also influenced by signals which are totally different from the noise to be measured, such as by signals originating from fixed targets (fixed parasitic echoes, or clutter) or signals originating from actual targets which in this case will affect the estimate results.

Means are known and commonly used in radar equipment for eliminating the influence of spurious signals in the determination of the background noise level of a radar receiver. According to these known methods for eliminating the influence of clutter, reference is made to MTI radars, while to eliminate true targets the information derived from the radar detector itself is used.

A problem involved in these known methods, which is connected to the calculation of background noise level using a digital mode, concerns the performance of a dividing or multiplying operation which is needed for determining the level itself and, in case several noise samples have been used, involves the use of multipliers or dividers with a high number of bits. This is expensive in terms of circuit complexity and, therefore, cost and size.

One object of the present invention is to eliminate the need of dividing or multiplying operations for the determination of the background noise level, and consequently to eliminate the corresponding multiplying or dividing units which in known background noise level measurement means of an MTI radar system are required for spurious signal influence suppression.

The noise level measurement device comprises: a multiplexer circuit (22) having a first, a second and a third input (27, 28, 29) and one output (30), a first shifting circuit (23), a storage element (24), a second shifting circuit (25) with two inputs (33 and 34) and one output (35), an inverter (21) with an input (31) fed by the output of the radar target detector (16) and with two outputs (29, 32), and a counter (26), wherein the first input (27) of the multiplexer (22) is connected to the generator (not shown) of a zero logic level signal, the second input (28) of the multiplexer (22) is connected to the output of the absolute value extractor (15) of a conventional MTI filter (14) from which the absolute value of the target signal freed from fixed target signals is obtainable, the third input (29) of the multiplexer (22) is connected to one of the outputs (29) of the inverter (21), the output (30) of the multiplexer (22) is connected to a group of cascaded elements consisting, in succession, of the first shifting circuit (23) and of the storage element (24), the output of the storage element (24) is connected to the first input (33) of the second shifting circuit (25), the input (31) of the inverter (21) is connected to the output (31) of the detector (16) of the conventional MTI radar, said output being high when a target is detected, the first output (29) of the inverter (21) is connected to the third input of the multiplexer (22), and its second output (32) applies through the counter (26) an enabling signal to the second input (34) of the second scaling circuit (25), wherein the signal applied to the input (31) of the inverter (21) consists of the output signal of a target detector of the fixed-threshold radar.

The above objects as well as other features and advantages of the present invention will become evident from the following detailed description of embodiments of the invention as shown on the enclosed drawings, in which:

FIG. 3 is a second embodiment of the device according to the present invention in which the threshold is variable depending on the background noise;

FIG. 4 shows a typical application of the device according to the present invention.

The concept on which the invention is based is to calculate the radar noise level by suitably averaging some samples belonging to said noise, taken at a well-determined point (specified below) in the chain through which the signal is processed. The following relation is calculated $$m_1 = \sum_{i=1}^{N} (x_i \cdot 2^{-L})$$

where $x_i$ is the generic noise sample, while the $2^{-L}$ factor serves to limit the dynamic range of $m_1$. The N parameter represents the usual number of samples for the calculation and L is an integer whose value is generally of a few units (2-5) and whose determination is not within the scope of the present invention but depends only on the characteristics of the radar equipment. The background noise level received by the radar, as expressed in terms of mean square deviation, is $$\delta = K \frac{\sum_{i=1}^{N} x_i}{N}$$

where K accounts for the fact that the noise has been processed and its statistical properties have consequently changed; K is a number, usually non-integer, depending on the type of implementation of the radar equipment, which can easily be calculated by an expert in the art and is not whithin the scope of the present invention.

Taking into account $m_1$ gives $$\delta = \frac{K}{N} 2^L m_1$$

Because K is a constant depending on the type of processing which the noise undergoes, N can be chosen so that $$K/N \simeq 2^{-M}$$

where M is an integer which, like L, generally amounts to a few units and whose determination, being obvious for a person skilled in the art, is beyond the scope of the present invention; in this case one obtains $$\delta \simeq m_1 \cdot 2^{-M+L}$$

i.e. the noise level is determined using summing and shifting operations only, which are easily obtainable with a circuitry using conventional digital techniques.

Figure 1:
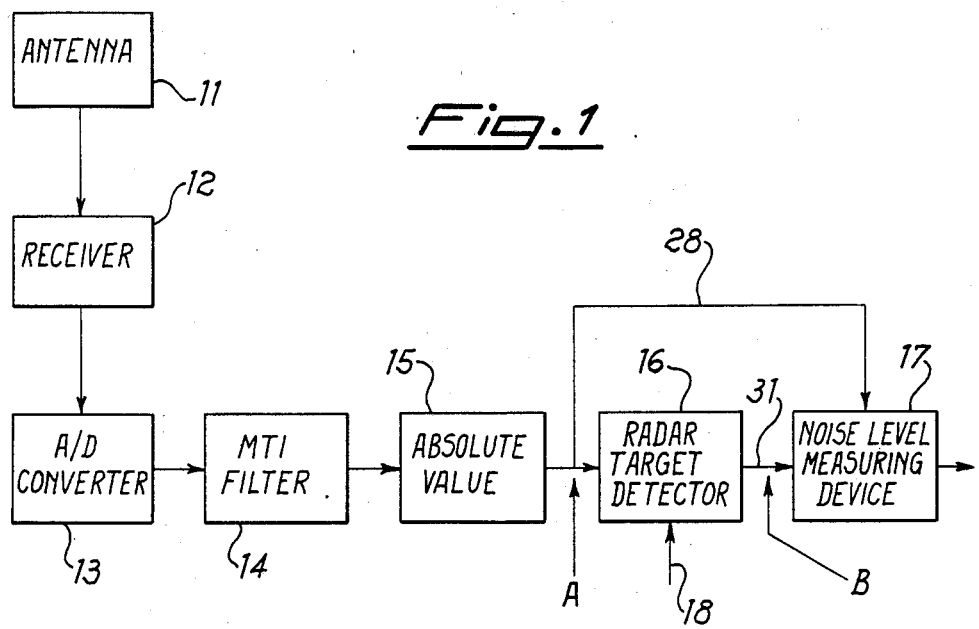
FIG. 1 is a block diagram of a radar system in which the noise level measurement device according to the present invention is embodied.

Reference shall now be made to FIG. 1 showing a block diagram for a radar system to which the invention can be applied in such a manner as to exploit fully its possibilities.

In order to have an estimate of the noise level received by the radar which is unaffected by other types of signal, the invention has been incorporated in a detection network of an MTI radar, so as to take profit of the presence of a detector for the recognition of signals coming from real targets.

The block 11 represents the antenna which picks up the signal coming from a possible target and makes it available to the block 12, which is the receiver; the output signal of the receiver goes to block 13 which is, analog to digital converter which translates the analog signal into a set of values represented by a given number of binary digits. The output of block 13 is applied to 14 which is a conventional MTI filter for clutter elimination; the output of filter MTI goes to block 15 which takes the absolute value of the signal being processed and sends it to block 16, named detector, which compares it to a reference threshold 18 and generates a high output signal (logical 1) if this threshold is exceeded, or a low signal (logical zero) in the opposite case. The output of 16, together with that of 15, is fed to block 17 which represents the noise level measuring device according to the present invention, as described in more detail in FIG. 2.

It should be noted that the output of block 15, which is shown as A in FIG. 1, is a signal represented by a plurality of binary digits, while output 16 which is shown as B in the same figure consists of a single digit, namely 1 if a target is present, 0 in the opposite case.

Figure 2:
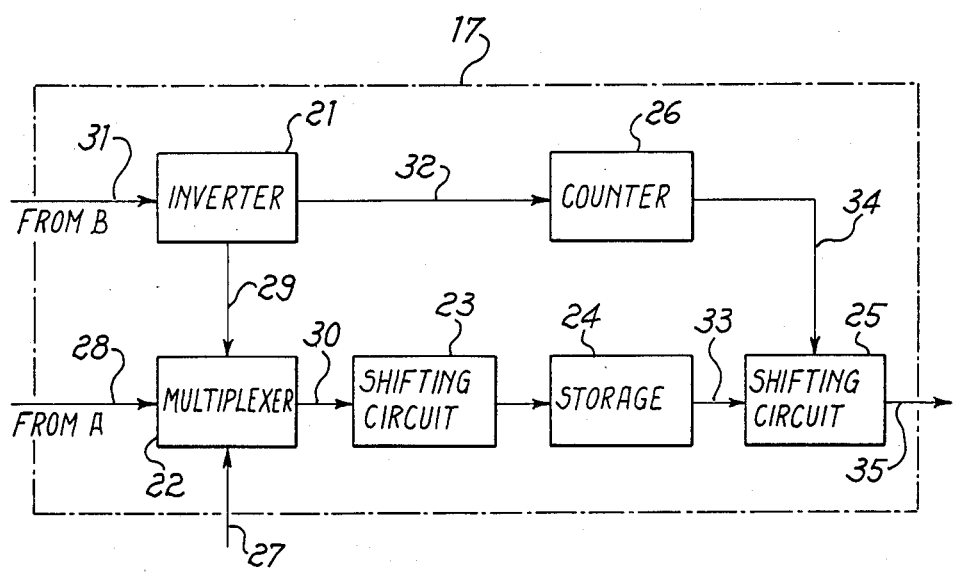
FIG. 2 is a block diagram of an embodiment of the noise level measurement device according to the present invention.

In FIG. 2, the block 22 has three input signals represented by the output 28 of block 15 in FIG. 1, the input 27 to which a logical zero is applied by a signal generator (not represented), and the output 29 of block 21; block 22 is a multiplexer circuit which selects the input 26 in case the output of 21 is a "zero", or the other input if a "one" is output by 21.

The output of 22 is applied to 23 which performs a shifting operation, previously indicated by factor $2^{-L}$, i.e. a division by a power of 2, on the signal received and sends it to block 24 which is a buffer device whose output 33 represents one of the inputs of block 25, this being another circuit dividing by a power of 2, which operation has been indicated by the factor $2^{-M+L}$.

The second input of 25 is derived from block 26 and it is an enabling signal whose function shall be clarified below. The input of block 21 is the output of 16, which is high when a target is revealed, therefore its output will be high only in those cases in which no target is present, those cases being counted by counter block 26 which has been initialized at a given number N and as soon as this number is reached it will output a signal, enabling block 25 to operate a shifting, after which an estimate of the background noise level received by the radar will be available on its output.

Within block 16 of FIG. 1 a reference threshold is present to enable to decide whether a target has been revealed or not; the calculation of said threshold is a usual problem in the radar field and it is performed by assuming that the noise level present is the nominal level of the system. Should this noise increase, the threshold, if it is fixed, will no longer be adapted to the new operating conditions, so that noise-originated signals will be revealed as target, and this will evidently give rise to a malfunctioning of the system and also of the invention, since the noise samples revealed as targets would not be considered in the calculation of the level estimate. To obviate to this inconvenience an adaptive threshold, variable depending on the background noise, i.e. a circuit commonly named CFAR (Constant False Alarm Rate) can be adopted instead of a fixed threshold; in FIG. 3 a possible diagram is shown, similar to FIG. 1, in which blocks 11 to 15 have been omitted, being identical. The block 18' of FIG. 3 represents the adaptive threshold which has as its input the output of 15 and after processing this signal, in a known way depending on the type of CFAR circuit used, it supplies block 16 with a threshold signal which is no longer fixed but is variable depending upon the background noise received by the radar.

It should be noted that the number of samples N which are averaged can be changed by acting on the counter 26 in compliance with the requirement of avoiding the use of multiplier units.

FIG. 4 shows a diagram for a typical application of the invention, i.e. to detect the presence of an external jammer regardless of the presence of a CFAR circuit which tends to mask the jammer.

The output provided by the present invention is applied to a threshold in block 43, which has been set depending on the nominal background noise of the system; the output of block 42 goes high when the threshold is exceeded, so indicating the presence of an external jammer.

We claim:

1. A device for the in-line measurement of background noise in an MTI radar equipped with a target detector circuit which is driven by the absolute value of the MTI filter output signal and provides a binary target signal when a target is present, said device comprising:
   (a) an inverter having an input coupled to receive said binary target signal, and two outputs;
   (b) a multiplexer circuit having a first input coupled to receive a zero level logic signal, a second input coupled to receive the absolute value of said MTI filter output signal, a third input coupled to one of said outputs of said inverter, and an output;
   (c) a first shifting circuit having an input coupled to said output of said multiplexer, and an output;
   (d) a storage element having an input coupled to said output of said first shifting circuit and an output;
   (e) a counter having an input coupled to the other output of said inverter, and an output; and
   (f) a second shifting circuit having a first input coupled to said output of said storage element, a second input coupled to said counter and an output on which a signal representative of said background noise is provided.

* * * * *